United States Patent Office 3,672,962
Patented June 27, 1972

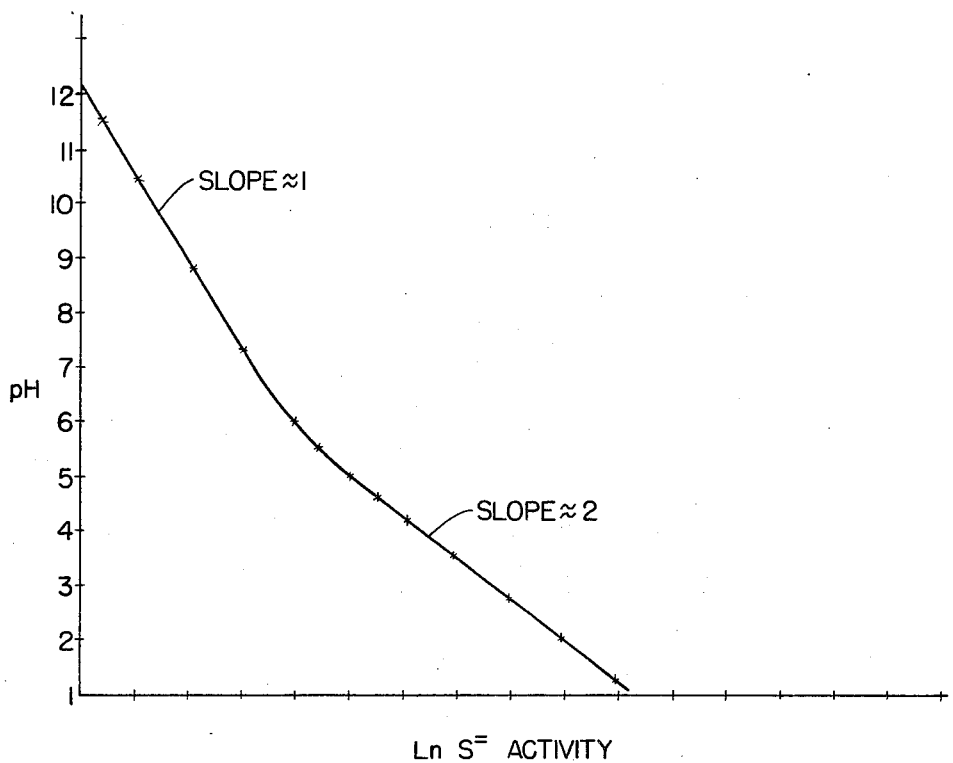
FIG. 3
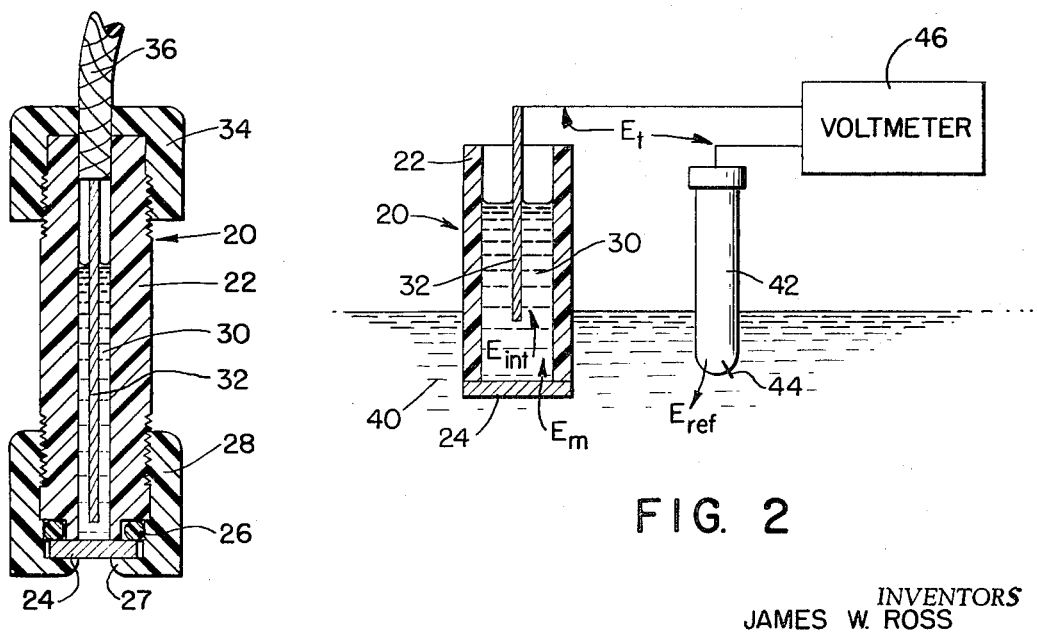
FIG. 1
FIG. 2

3,672,962
ION-SENSITIVE ELECTRODE AND METHOD OF MAKING AND USING SAME
Martin S. Frant and James W. Ross, Newton, Mass., assignors to Orion Research Incorporated, Cambridge, Mass.
Continuation of application Ser. No. 511,751, Dec. 6, 1965. This application Mar. 17, 1971, Ser. No. 125,390
Int. Cl. G01n 27/46
U.S. Cl. 204—1 T
9 Claims

ABSTRACT OF THE DISCLOSURE

A potentiometric type electrode for detecting sulfide ion activity in solution, and methods of making and using same. The electrode has, as its ion-sensitive element, a membrane of substantially imporous, high purity silver sulfide substantially free of metallic silver. The membrane is preferably made by compressing silver sulfide powder to form an imporous sheet or pellet. The membrane is used by contacting one surface to a reference electrode at a fixed potential while contacting the other surface with the test solution, thus creating a half-cell across which voltage will vary as a function of ion-activity in the test solution in a Nernstian manner.

---

This application is a continuation of application Ser. No. 511,751, filed Dec. 6, 1965, now abandoned.

This invention relates to electrochemical detection and measurement and more particularly to methods for determining and measuring the presence of sulfides and novel apparatus for use in such methods.

Sulfides can be detected with reasonable selectivity by a number of known instrumental techniques. Spectrophotometric methods are often used, but since sulfide ions in solution do not substantially absorb light, it is usual to add reagents which react with sulfide ions to develop light-absorbing species. Polarographic and amperometric detectors are also known, but require precise control of flow of the medium being sampled if detection is to be accomplished continuously. The use of potentiometric electrodes has been suggested and such electrodes for sulfide determinations have been studied by a number of workers. An excellent review of these studies is set forth in Reference Electrodes, J. Ives and G. Jantz, Academic Press, New York, 1961 (Chapter VII). A consensus of the literature indicates that only silver and mercury redox couples respond to sulfide ion activity, but electrodes made from these metals exhibits driftiness and irreproducible potentials. Although these electrodes have been useful for determination of titration end points, they lack the stability necessary for absolute activity measurement.

The present invention, therefore, contemplates an improved method and means for detecting electrochemically, the presence of sulfide ions in solution.

Further objects of the present invention are to provide a method of detecting sulfide ions which requires no reagent addition or sample pretreatment, and is insensitive to sample solution flow rate, thereby permitting direct on-stream monitoring; to provide means for carrying out the foregoing method which yields a continuous output signal voltage bearing a simple logarithmic relation to sulfide activity with sufficiently rapid response time to changes in the sulfide activity to permit control in substantially real-time.

Yet another principal object of the invention is to provide an electrode sensitive to sulfide ion activity in a stable and reproducible manner.

Still another object of the present invention is to provide a sulfide electrode comprising means supporting a barrier or membrane of silver sulfide substantially without any free silver metal, and means in electrical contact with one side of the membrane at a substantially fixed reference potential.

Yet other objects of the invention will in part be obvious and will in part appear hereinafter. The invention accordingly comprises the apparatus possessing the construction, combination of elements, and arrangement of parts and comprises the several steps and the relation of one or more of such steps with respect to each of the others all of which are exemplified in the following detailed disclosure, and the scope of the application of which will be indicated in the claims.

For a fuller understanding of the nature and objects of the present invention, reference should be had to the following detailed description taken in connection with the accompanying drawing wherein:

FIG. 1 is a schematic, side-elevational, cross-sectional diagram of an electrode embodying the principles of the present invention and useful for sulfide ion detection in a solution;

FIG. 2 is a schematic, side-elevational view, partly in cross-section, of a cell employing an electrode similar to FIG. 1 for the detection of sulfide ions;

FIG. 3 is a graph showing the effect of pH change on the response of the electrode of the invention to sulfide ions.

It has been found that electrodes prepared by anodizing silver in sulfide solutions were generaly drifty and yielded irreproducible potentials, thus corroborating the literature. Rather than use the electron transfer reaction

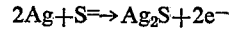

$$2Ag + S^= \rightarrow Ag_2S + 2e^-$$

as the source of electrode potential, the present invention is based upon the use of a membrane of silver sulfide substantially free of any free silver that could enter into such a reaction. The term "membrane" as used herein, consistent with its usage in potentiometric electrode technology, is intended to embrace a sheet-like structure, generally regardless of flexibility or curvature, which provides a pair of limiting surfaces between which change transfer is effected.

Referring now to the drawing, there is shown in FIG. 1 electrode 20 embodying the principles of the present invention and comprising an elongated, hollow tubular container or stem 22 open at both ends. The stem typically is formed of an liquid-impervious, substantially rigid, electrically-insulating material, such as unplasticized polyvinylchloride, polytetrafluoroethylene, glass or the like, substantially chemically inert to solutions containing sulfide ions and with which the stem might be placed in contact.

One end of stem 22 is capped or sealed with a barrier disc or membrane 24 formed of substantially imporous, high-purity, silver sulfide which contains substantially no free metallic silver. Membrane 24 can be quite thick, for example, ¼″, although thinner structures are preferred. Membrane 24 can be sealed across the one end of stem 22 with an appropriate sealing compound such as an epoxy resin, but advantageously, as shown, is mounted on O-ring 26 disposed about the periphery of the opening in the stem, and held in a pressed-fit against the O-ring by annular flange 27 of collar 28 threadedly mounted on the stem. When collar 28 is rotated in the proper direction, it advances axially, forcing membrane 24 in a tight fit against the O-ring, thus sealing the one end of stem 22. Both the O-ring and collar 28 are preferably made of a plastic material such as polyvinylchloride.

Disposed internally of stem 22 and in electrical and physical contact with the inner surface of membrane 24 is charge transfer means providing a fixed concentration of silver either in metallic or ionic form. This means is shown as a reference electrolyte 30, for example, an aqueous saturated solution of KCl and AgCl. Immersed in electrolyte 30 is internal reference electrode 32, for example the well-known Ag-AgCl element. This combination of electrolyte 30 and reference electrode 32 provides means for electrically contacting the internal face (i.e. the surface of the membrane contacting the electrolyte) at a substantially stable or fixed potential. This is achieved because of the use of a fixed silver concentration. If, for example, electrolyte 30 is merely solid silver, it will be appreciated that charge transfer at a fixed potential will occur between the silver and the silver sulfide by ion transfer. In such event, the reference electrode used need merely be a metallic wire such as copper, inasmuch as the silver to copper junction will transfer charge by electrons.

The other open end of stem 22 is fitted with annular cap 34 having an aperture in which is sealed the usual coaxial cable 36, the central conductor of which is connected to internal reference electrode 32 and the peripheral conductor of which is intended to provide electrostatic shielding.

The more important considerations in fabricating the electrode of FIG. 1 lie in the structure of membrane 24 and the nature of the seal between the electrode stem and the membrane as above described. The other elements and the shape and size of the electrode are not particularly critical and can be selected according to the anticipated use.

Silver sulfide is unusual in that, not only is it highly insoluble in water ($K_{sp}10^{-52}$), but in at least its low temperature ($\beta$) form has a relatively low electrical bulk-resistivity coupled with exceptionally high cationic conductivity, i.e. electrical conductivity through the silver sulfide crystal lattice is effected primarily by migration of silver ions instead of by a conduction mechanism involving sulfide ions or electrons. The silver sulfide membrane of the present invention must be of a relatively high state of purity since the presence of foreign ions or molecules, such as $Ag_2O$, tends to cause porosity and poor mechanical properties. The membrane surface available to react with sulfide ions should be as free of elemental silver and sulfur as possible since either, particularly silver, causes unstable and drifting potentials.

A preferred method of preparing the silver sulfide is to add the purest available $AgNO_3$ in aqueous solution to a slight excess of aqueous sodium thiosulfate, thereby precipitating out $Ag_2S$. The addition is performed at room temperature with good agitation.

The precipitate is allowed to settle over about one hour, the solution is then decanted, fresh distilled water added, and the solution is boiled for one or two hours. The steps of settling, decanting and washing in boiling water are repeated several times and the precipitate finally filtered out. The filtered precipitate is slurried in distilled water, filtered, washed, first with dilute nitric acid and then with more distilled water, being thereafter dried under vacuum. The dried precipitate is finally slurried in $CS_2$ to dissolve any residual sulfur, filtered, washed with acetone, and dried at 80–100° C. in air.

While a number of techniques are available to form the $Ag_2S$ powder into an imporous membrane, it is preferred to form membrane 24 in the shape of thin, cylindrical pellets or discs by pressing the $Ag_2S$ powder under vacuum, a technique similar to that used in preparing KBr pellets for infra-red spectroscopy. Sintering or casting are extremely difficult techniques to use, even in controlled atmospheres because of the tendency of $Ag_2S$ to decompose around its melting point. Pressing is done in a die of hardened and polished steel in which a moderate vacuum could be applied during compression. To obtain non-porous discs, minimum pressures of about 60,000 to 75,000 p.s.i. should be used. If the $Ag_2S$ is sufficiently pure, no attack on the steel dies will be observed.

A membrane of $Ag_2S$ separating two solutions, one of which contains silver ions at a fixed concentration and the other of which is a sample solution, will develop a potential $E_m$ according to the well-know Nernst equation as follows:

(1) $$E_m = \text{constant} + \frac{RT}{F} \ln A_{Ag+}$$

Where $A_{Ag+}$ is the silver ion activity in the sample solution. However, since $Ag_2S$ is extremely insoluble, $A_{Ag+}$ is fixed by the presence of the solid salt and can be expressed in terms of the sulfide activity $A_{S=}$ of the sample solution through the solubility product $K_{sp}$ of $Ag_2S$, i.e.

(2) $$A^2_{Ag+} = \frac{K_{sp}}{A_{s=}}$$

Equation (1) then can be rewritten as (3) $$E_m = \text{constant} - \frac{RT}{2F} \ln A_{s=}$$

In operation, this logarithmic reaction is observed as will be described hereinafter.

As shown in FIG. 2, electrode 20 of the present invention in use is placed so that the outer surface of membrane 24 contacts solution 40 under test (i.e. which contains the sulfide ions sought to be detected). A standard reference electrode 42 is also placed in contact with solution 40.

Electrode 42 typically is the usual assembly housed in a conventional glass shell containing an Ag-AgCl electrode in saturated KCl-AgCl separated by an asbestos fiber junction from a 1 M NaOH solution. The latter solution occupies the lower end of the shell and is coupled to solution 40 through the usual fiber junction shown at 44. Both electrode 20 and electrode 42 are connected electrically to respective inputs of electrometric device 46, the latter being preferably the usual high-input impedance voltmeter.

In operation of the assembly of FIG. 2, a potential, $E_{ref}$, of substantially fixed value (assuming constant temperature conditions) develops between reference electrode 42 and solution 40 independently of sulfide concentration in the latter. Another potential, $E_m$, will develop across membrane 24 between internal electrolyte 30 and solution 40, but $E_m$ is dependent or varies logarithmically according to the activity or concentration of sulfide ions in solution 40. Because the potential, $E_{int}$, between reference electrode 32 and electrolyte 30 is also fixed, the total potential $E_t$, appearing between electrode 42 and 20 will be the sum of $E_m$, $E_{ref}$ and $E_{int}$, and thus varies with $E_m$ only. $E_t$ can be readily measured on electrometric device 46, thus indicating the presence and activity of the sulfide ions in solution 40.

The electrode of FIG. 1 was tested in an assembly such as that of FIG. 2, in a number of experiments to determine the nature of the response to sulfide ions as set forth in the following examples:

EXAMPLE I

A number of test solutions were prepared by weighing out approximately 24 grams of $Na_2S \cdot 9H_2O$ and dissolving in one liter of 1 M NaOH. Serial dilutions were made for lower concentrations using 1 M NaOH solution as the diluent. This provided a series of samples of constant NaOH background concentration with varying amounts of $Na_2S$. Since the solutions were at nearly constant ionic strength, the activity coefficient of sulfide ion was believed also to be nearly constant. Further, the constant pH provided by the background NaOH insure that a constant fraction of the total sulfide present was in the form, $S=$. Under these conditions a plot of the potential measured vs. log $Na_2S$ should be a straight line with a slope given by $RT/2F$ of 29 mv. per decade change in $Na_2S$ concentration. The following table of measured results indicates excellent agreement with theory.

| Response in mv. vs. ref. electrode: | Concentrations $NA_2S$ in mols |
|---|---|
| −750.5 | $5 \times 10^{-4}$ |
| −761.5 | $1 \times 10^{-3}$ |
| −783 | $5 \times 10^{-3}$ |
| −792 | $1 \times 10^{-2}$ |
| −819 | $1 \times 10^{-1}$ |

The time response of the electrode is limited by solution carryover, being 1 minute or less for a decade change in sodium sulfide concentration. The response time can be considerably reduced by providing quick drainage for the exterior of the $Ag_2S$ disc. Under conditions of ambient room temperature the electrode reproduces its output potential in standard solutions to within about 1 mv. over periods of several hours. The acual variations in reproducibility, due to the electrode itself, are even smaller because some of the variation is due to the "standard solutions being in fact non-standard," it being difficult to prevent oxidation by air of stored alkaline sulfide standard solutions to sulfur and other products.

EXAMPLE II

Measurement was made to determine the sulfide concentration range over which the electrode senses sulfide activity. To this end two titrations were made simultaneously in the same solution with a pH electrode and the electrode of the present invention, the solution being initially 1 M in NaOH and 1 M in $Na_2S$. The titrations were carried out with 1 M HCl. The data obtained were plotted as shown in FIG. 3.

In FIG. 3 the log of $S^=$ activity was plotted against pH. In the individual response of each electrode, one to pH, the other to sulfide, two inflections occurred and were believed to correspond to a stepwise conversion of $S^=$ to $HS^-$ and then finally to $H_2S$. In the curve of FIG. 3 there appears to be two straight line segments whose slopes indicate a change of $S^=$ activity of about one decade per decade change in pH in high pH solutions (i.e. >pH 7) and two decades per decade change in pH in low pH solutions (i.e. <pH 7). The straight line relationship at pH values approaching 1 indicates that the electrode of the present invention appears to be sensing sulfide even at free sulfide ion concentrations of as low as $10^{-17}$ M.

The silver sulfide membrane has a much lower resistance than the ordinary pH glass electrode and will function to the freezing point of most aqueous solutions. High temperature performance is limited largely by the internal pressure generated by an aqueous filling solution or internal liquid electrolyte. However, with some loss of freedom to adjust the isopotential $pS^=$ to an optimum value, the internal filling solution can be replaced with a metallic silver coating directly bonded to the inner surface of membrane 24 and to reference electrode 32. This permits the useful upper temperature limit to be extended to about 175° at which temperature $Ag_2S$ undergoes a solid phase transformation to its $\alpha$ state with accompanying mechanical failure of the membrane.

The electrode of the present invention is quite specific in its response to sulfide ion. The extreme insolubility of $Ag_2S$ prevents interference due to metathetical reactions with all ionic species in aqueous solution except mercuric ions which, however, cannot exist to any substantial extent in solutions containing significant amounts of sulfide ions. The electrode is generally unaffected by organic materials and by complexing ions which are known to poison other silver salt electrodes such as the Ag-AgCl reference electrode.

Obviously, other electrode configurations can be made. Advantageously, silver sulfide in highly compressed form as above described, can be readily machined into a variety of shapes. Thus, for example, a flow-through type of sulfide electrode can be made by compressing $Ag_2S$ into cylindrical form and axially boring out the center to form a hollow tube with walls as thick as ¼". The exterior of the tube can then be electrically connected at a fixed contact potential to a wire as by coating the tube with an annular strip of silver and connecting the wire to the latter. The exterior is then sealed with insulation. If a solution with sulfide ions is passed through the tube interior, the desired potential will develop across the tube from the interface with the solution to the silver strip.

Since certain changes may be made in the above apparatus and processes without departing from the scope of the invention herein involved it is intended that all matter contained in the above description or shown in the accompanying drawing shall be interpreted in an illustrative and not in a limiting sense.

What is claimed is:

1. An electrode for detecting sulfide ion activity in solution with which said electrode is in contact, and comprising, in combination:
    a substantially imporous membrane of high purity silver sulfide adapted to have one surface thereof for providing said contact with said solution, at least said surface being substantially free of metallic silver; and
    means forming an electrical contact with an opposite surface of said membrane at a substantially fixed contact potential.

2. An electrode as defined in claim 1 wherein said means forming an electrical contact comprises silver, in metallic or ionic form, in contact with said opposite surface and electrically conductive means in contact with said silver.

3. An electrode as defined in claim 1 wherein said membrane is a sheet of compressed silver sulfide particles.

4. An electrode as defined in claim 6 wherein said means forming an electrical contact comprises:
    an electrolytic solution disposed inside said body in contact with said membrane, said solution having silver ions therein at a substantially fixed concentration;
    reference electrode means establishing a fixed contact potential with said electrolyte; and
    electrically conductive means coupled to said reference electrode means.

5. An electrode as defined in claim 3 wherein said means forming an electrical contact comprises a mass of silver metal contacting said opposite surface of said membrane, and electrically conductive means coupled to said mass of silver.

6. An electrode as defined in claim 1 including a hollow electrode body of electrically insulating material having an aperture therein, said membrane being disposed in sealing relation across said aperture.

7. Method of making an electrode sensitive to sulfide ions in solution, and comprising the step of forming the ion-sensitive portion of said electrode as a substantially imporous membrane having a surface thereof adapted to contact said solution, said surface being formed of only compressed high purity silver sulfide substantially free of metallic silver.

8. Method as defined in claim 7 wherein said step of forming comprises:
    compressing said silver sulfide in powdered form at pressures of about 60,000 p.s.i. at room temperature.

9. Method of measuring the activity of sulfide ion in solution, and comprising the steps of:
    contacting said solution with a reference electrode to establish a fixed reference potential;
    contacting said solution with a surface of a substantially imporous membrane, said surface being of only high purity $Ag_2S$ substantially free of silver;
    connecting the other membrane surface to electrically conductive means at a substantially fixed contact potential; and measuring potential between said reference electrode and said electrically conductive means.

References Cited
UNITED STATES PATENTS
3,111,478   11/1963   Watanabe   --------   204—195 F
3,219,556   11/1965   Arthur et al.   ------   204—195 M

OTHER REFERENCES
Noddock et al., "Z. Elektrochem.," vol. 59, 1955, pp. 96–102.

Trumyder, "Z. Physikalish Chemie," vol. 99, 1921, pp. 9–15, 19–21, 35, 36, 41 and 42.

Buck, "Analytical Chemistry," vol. 40, No. 10, August 1968, pp. 1432–1439.

Ruelschi et al., "J. of the Electrochemical Soc.," July 1965, pp. 665–670.

Kolthoff et al., "J. of the Am. Chem. Soc.," vol. 59, pp. 416–420 (1937).

Ives et al., "Reference Electrodes," 1961, pp. 379–383.

Dunlap, "An Introduction to Semiconductors," 1957, p. 313.

TA-HSUNG TUNG, Primary Examiner

U.S. Cl. X.R.

204—195 M